3,321,361
ACARICIDAL METHOD
Julius J. Menn, San Jose, Calif., and Walter A. Stamm, Tarrytown, N.Y., assignors to Stauffer Chemical Company, New York, N.Y., a corporation of Delaware
No Drawing. Filed Apr. 6, 1964, Ser. No. 357,821
6 Claims. (Cl. 167—22)

This invention relates to a class of organotin-containing pesticides and a method for utilizing the same.

In particular, this invention relates to compounds which provide new and valuable properties. These compounds have been found to be useful and particularly effective against mite organisms belonging to the class acarina. The term mites is used herein to include both mites and ticks, which are related biologically and are included in the taxonomy acarina. The invention is, therefore, also concerned with acaricidal compositions having the aforementioned organotin compounds as active components therein.

Mites are a serious problem in agriculture and horticulture. Mites are widely distributed throughout the world, and in the United States they are known to attack a wide variety of horticultural and agricultural plants, and poultry and livestock. Few other pests cause greater damage to so wide a range of hosts as do mites.

As might be expected, a considerable assortment of parasiticidal materials have been suggested and investigated for the control of mite organisms. Among the organic biocides found effective in controlling a great variety of pest organisms are the organo phosphorus compounds. The organophosphorus esters have proven exceptionally effective for destroying insects. Several of the commercial insecticides which are currently being manufactured and employed for this purpose include as the toxic ingredient one or more of the organo-phosphorus esters. Although the newly developed insecticides give excellent protection against insects, certain other pest organisms have proved more difficult to control. For example, certain species of the phytophagous mites of the class acarina have exhibited an unusual degree of resistance to many of the commonly used insecticides. It is also known that certain organisms are capable of developing resistance to certain classes of insecticides and acaricides; especially to be noted are the organophosphorus materials. Therefore, there exists a continuing search for new materials to control the aforesaid pests wherein satisfactory control will be realized.

It has ben discovered that certain organotin compounds are especially effective in the control of acarids and the provision of a method for combating said pest organisms by means of certain organotin compounds constitutes the principal object of this invention. Yet further objects will become apparent throughout the balance of the invention.

The compounds of the present invention are trialkyl tin compounds which may be represented by the formula

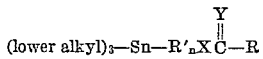

wherein the lower alkyl groups contain from 1 to 6 carbon atoms, inclusive, X and Y are selected from the group consisting of oxygen and sulfur, R' is a methylene radical with $n$ from 0 to 5, inclusive, and R is selected from the group consisting of alkyl, alkenyl, phenyl and substituted alkyl, alkenyl and phenyl groups wherein the substituents are halogen, hydroxyl, amino and nitro groups.

Several of the organotin compounds, the acaricidal utility of which is herein contemplated, are known in the chemical arts. R. K. Ingham et al., Chemical Reviews 60, 494–8 (1960), describes various methods that may be employed to prepare the trialkyltin esters and thioesters of the present invention. As an example, the trialkyl tin esters, wherein $n=0$, are generally prepared by cleaving a bis(trialkyltin) oxide with the suitable acid. Typically, one mole of the bis(trialkyltin) oxide and two equivalents of the acid are heated together in the presence of a relatively inert liquid organic solvent or if desired in the absence of the solvent using the reactants to make up the solution.

Other compounds of this invention, wherein $n>1$, are prepared by relatively new methods. The method therein employed consisted of adding the acidic moiety to trialkyl-monoalkenyltin compounds. This reaction can be brought to completion with the aid of free radical initiating catalysts, such as actinic radiation or organic peroxides. Preferably, an excess of thioacid was added dropwise into the trialkyl-monoalkenyltin compound under ultraviolet irradiation at about 0° C. After several hours of irradiation the excess of thioacid was distilled off at reduced pressure and the product purified according to conventional methods.

In practising the present invention any of the various techniques or methods can be employed for contacting the mites with the toxic organotin compound. For example, spray formulations can be prepared by dissolving the organotin compound in suitable organic solvents such as toluene, xylene, benzene and the like, and subsequent dispersion of this solution in water in the presence of a surface active wetting or emulsifying agent. Another method by which the acaricidal agents of the present invention can be applied is in the form of dispersible powders, preferably as homogeneous free-flowing dusts commonly formulated by mixing the active component with finely divided solids or carriers such as talc, natural clays, diatomaceous earth, various flours such as walnut shell, wheat and the like. The details of compounding and application are well known to those skilled in the art.

The compounds of the present invention were tested as acaricides according to the following method.

*Acaricidal evaluation test.*—The two-spotted mite, *Tetranychus telarius* (Linn.), was employed in tests for acaricidal activity. Young pinto bean plants in the primary leaf stage were used as host plants. The young pinto bean plants were infested with several hundred mites. Dispersions of the candidate materials were prepared by dissolving 0.1 gram in 10 ml. of a suitable solvent, usually acetone. Aliquots of the toxicant solutions were suspended in water containing 0.0175% v./v. Sponto 221, a commercial emulsifying agent. The amount of water used was sufficient to give concentrations of active ingredient ranging from 0.25% to 0.0005%. The test suspensions were then sprayed on the infested pinto bean plants. After seven days, mortality of post-embryonic and egg forms were determined. The percentage of kill was determined by comparison with control plants which had not been sprayed with the candidate compounds. The LC–50 value was calculated using well-known procedures. The LC–50 values are reported under columns PE (post-embryonic) and E (eggs) in the following table.

TABLE.—ACARICIDAL ACTIVITY
(Lower alkyl)$_3$-Sn(CH$_2$)$_n$XC(Y)R

| Lower alkyl | n | XC(Y)R | Two-spotted mite (LC-50) | |
|---|---|---|---|---|
| | | | PE | E |
| n-C$_4$H$_9$ | 0 | SC(O)CH$_3$ | .003 | .008 |
| n-C$_4$H$_9$ | 0 | OC(O)CH$_2$Cl | .003 | .03 |
| n-C$_4$H$_9$ | 0 | SC(O)C$_6$H$_5$ | .001 | .008 |
| n-C$_4$H$_9$ | 0 | OC(O)CH$_2$(CH$_2$)$_6$CH=CHC$_8$H$_{17}$ | .005 | .03 |
| i-C$_4$H$_9$ | 0 | SC(O)CH$_3$ | .01 | .01 |
| i-C$_4$H$_9$ | 0 | SC(O)C$_6$H$_5$ | .01 | >.01 |
| n-C$_4$H$_9$ | 0 | OC(O)CH$_2$Br | .04 | .04 |
| n-C$_4$H$_9$ | 0 | OC(O)CHBrCH$_3$ | .01 | .01 |
| n-C$_4$H$_9$ | 0 | OC(O)CH$_2$C$_{16}$H$_{27}$ | .008 | .03 |
| n-C$_4$H$_9$ | 0 | OC(O)CCl$_3$ | .005 | .03 |
| n-C$_4$H$_9$ | 0 | OC(O)CH$_2$(CH$_2$)$_9$NH$_2$ | .005 | .05 |
| n-C$_4$H$_9$ | 0 | OC(O)CCl=CClCCl=CCl$_2$ | .005 | .07 |
| n-C$_4$H$_9$ | 0 | OC(O)—C$_6$H$_4$=4=NH$_2$ | .03 | .03 |
| n-C$_4$H$_9$ | 3 | SC(O)CH$_3$ | .003 | .03 |
| n-C$_4$H$_9$ | 3 | SC(O)CH$_2$CH$_2$CH$_3$ | >.01 | >.01 |
| n-C$_4$H$_9$ | 0 | OC(O)C$_6$H$_3$=2=OH=4=NH$_2$ | .01 | .01 |
| n-C$_4$H$_9$ | 0 | OC(O)C$_6$H$_3$=2=NO$_2$=5=CH$_3$ | .01 | .01 |
| n-C$_4$H$_9$ | 0 | OC(O)CH$_2$C$_6$H$_4$=4=NO$_2$ | .01 | .05 |
| i-C$_4$H$_9$ | 0 | OC(O)CHClCH$_3$ | .08 | .08 |
| i-C$_4$H$_9$ | 0 | OC(O)CH$_2$Cl | .12 | |
| i-C$_4$H$_9$ | 0 | OC(O)CCl$_3$ | <.05 | .05 |

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The method of controlling acarids comprising applying thereto an effective amount of a compound of the formula

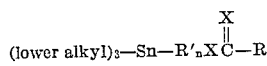

wherein the lower alkyl groups contain from 1 to 6 carbon atoms, inclusive, X and Y are selected from the group consisting of oxygen and sulfur, R' is a methylene radical with $n$ from 0 to 5, inclusive, and R is selected from the group consisting of alkyl, alkenyl, phenyl and substituted alkyl, alkenyl and phenyl groups, wherein the substituents are halogen, alkyl, hydroxyl, amino and nitro groups.

2. The method of controlling acarids comprising applying thereto an effective amount of the compound tri-n-butyltin thioacetate.

3. The method of controlling acarids comprising applying thereto an effective amount of the compound tri-n-butyltin monochloroacetate.

4. The method of controlling acarids comprising applying thereto an effective amount of the compound tri-n-butyltin trimethylenethioacetate.

5. The method of controlling acarids comprising applying thereto an effective amount of the compound tri-n-butyltin thiobenzoate.

6. The method of controlling acarids comprising applying thereto an effective amount of the compound tri-n-butyltin oleate.

References Cited by the Examiner
UNITED STATES PATENTS

| | | | |
|---|---|---|---|
| 3,037,039 | 5/1962 | Mazur | 260—429.7 |
| 3,070,615 | 12/1962 | Seyferth | 260—429.7 |
| 3,095,434 | 6/1963 | Stamm et al. | 260—429.7 |
| 3,099,668 | 7/1963 | Zweigle et al. | 260—429.7 |
| 3,105,000 | 9/1963 | Hardy | 167—22 |
| 3,113,144 | 12/1963 | Zweigle | 260—429.7 |
| 3,117,146 | 1/1964 | Zweigle et al. | 260—429.7 |
| 3,117,147 | 1/1964 | Langer | 260—429.7 |
| 3,122,576 | 2/1964 | Jason et al. | 260—429.7 |
| 3,129,236 | 4/1964 | Weissenberger | 260—429.7 |
| 3,152,156 | 10/1964 | Mageli et al. | 260—429.7 |

LEWIS GOTTS, *Primary Examiner.*

SHEP K. ROSE, *Assistant Examiner.*

UNITED STATES PATENT OFFICE
CERTIFICATE OF CORRECTION

Patent No. 3,321,361                                    May 23, 1967

Julius J. Menn et al.

It is hereby certified that error appears in the above numbered patent requiring correction and that the said Letters Patent should read as corrected below.

Column 3, in the TABLE, third column, line 13 thereof, for "$OC(O)-C_6H_4=4=NH_2$" read -- $OC(O)-C_6H_4-4-NH_2$ --; same table, third column, lines 16 to 18 should appear as shown below instead of as in the patent:

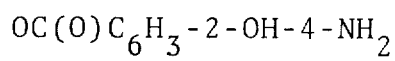

$$OC(O)C_6H_3-2-OH-4-NH_2$$

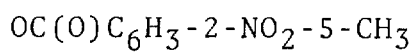

$$OC(O)C_6H_3-2-NO_2-5-CH_3$$

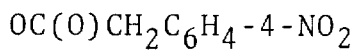

$$OC(O)CH_2C_6H_4-4-NO_2$$

column 3, lines 36 and 37, the formula should appear as shown below instead of as in the patent:

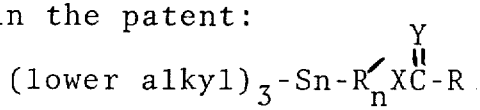

$$(\text{lower alkyl})_3-Sn-R'_n\overset{Y}{\underset{}{X\overset{\|}{C}}}-R$$

Signed and sealed this 3rd day of December 1968.

(SEAL)
Attest:

EDWARD M. FLETCHER, JR.                    EDWARD J. BRENNER
Attesting Officer                            Commissioner of Patents